United States Patent

Bartfai et al.

[11] Patent Number: 6,003,091
[45] Date of Patent: *Dec. 14, 1999

[54] VERIFYING A TIME-OF-DAY COUNTER

[75] Inventors: Robert Francis Bartfai, West Shokan; Derrick LeRoy Garmire, Kingston; Jay Robert Herring, Poughkeepsie, all of N.Y.; Francis Alfred Kampf, Fairfax, Vt.; Nicholas Paul Rash, Poughkeepsie; Kevin John Reilly, Kingston, both of N.Y.; Craig Brian Stunkel, Bethel, Conn.

[73] Assignee: International Business Machines Corporation, Armonk, N.Y.

[*] Notice: This patent is subject to a terminal disclaimer.

[21] Appl. No.: 08/831,540

[22] Filed: Apr. 8, 1997

[51] Int. Cl.⁶ ........................................................ G06F 1/12
[52] U.S. Cl. ............................................ 709/248; 713/401
[58] Field of Search .................................... 395/551, 553, 395/200.78, 555, 556, 559, 552; 327/144, 151, 153; 713/400, 500, 501, 600, 401; 709/234, 248

[56] References Cited

U.S. PATENT DOCUMENTS

| | | | |
|---|---|---|---|
| 4,803,708 | 2/1989 | Momose | 377/28 |
| 4,939,753 | 7/1990 | Olson | 375/356 |
| 5,146,585 | 9/1992 | Smith, III | 713/400 |
| 5,327,468 | 7/1994 | Edblad et al. | 375/356 |
| 5,371,733 | 12/1994 | Denneau et al. | 370/241 |
| 5,481,573 | 1/1996 | Jacobowitz et al. | 375/356 |
| 5,500,897 | 3/1996 | Hartman, Jr. | 380/25 |
| 5,504,878 | 4/1996 | Coscarella et al. | 709/248 |
| 5,579,513 | 11/1996 | Strohmer | 713/600 |
| 5,636,373 | 6/1997 | Glendening et al. | 713/400 |
| 5,870,427 | 2/1999 | Tiedemann et al. | 375/216 |

OTHER PUBLICATIONS

T. Basil Smith et al.; The IBM S/390 Sysplex Timer; Fault–Tolerant Computing, 1991 Int'l Symposium; pp. 144–151, Jun. 1991.

Andrew S. Tanenbaum; Structured Computer Organization, 2nd Edition; pp. 10–12, 1984.

B. Abali, C.B. Stunkel and C. Benveniste, "Clock Synchronization on a Multicomputer," Journal of Parallel and Distributed Computing, vol. 40, pp. 118–130 (1997).

Primary Examiner—Zarni Maung
Assistant Examiner—Kenneth R. Coulter
Attorney, Agent, or Firm—Floyd A. Gonzalez, Esq.; Heslin & Rothenberg, P.C.; Wayne F. Reinke, Esq.

[57] ABSTRACT

A quiesced and synchronous distributed data processing system includes a primary node, a secondary node and a switch between the primary and secondary nodes. The TOD for the primary node is set depending on the system. The invention sets the TOD for the switch based on the TOD of the primary node. The primary node then verifies the switch TOD. If verified, the TOD for the secondary node is set, based on the TOD of the primary node. Finally, the secondary node self-verifies its TOD.

20 Claims, 8 Drawing Sheets

VERIFYING A TIME-OF-DAY COUNTER

BACKGROUND OF THE INVENTION

This application contains subject matter which is related to the subject matter of the following application which is assigned to the same assignee as this application, and which is being filed concurrently herewith:

"Verifying a Time-of-Day Counter," by Bartfai et al., Ser. No. 08/825,793, filed Apr. 8, 1997, now allowed.

TECHNICAL FIELD

The present invention generally relates to time-of-day counters in computer systems. More particularly, the present invention relates to distributing and verifying a time-of-day counter in a quiesced and synchronous distributed computer system.

BACKGROUND INFORMATION

Existing synchronous distributed data processing systems do not verify the validity of time-of-day (TOD) counters. Failing to verify the validity of TOD's can result in skewed times in different nodes of the distributed data processing system. These skewed times can cause problems with ordering transactions.

Thus, a need exists for a way to verify the validity of TOD counters in synchronous distributed data processing systems.

SUMMARY OF THE INVENTION

Briefly, the present invention provides a way to verify the validity of TOD counters in quiesced and synchronous distributed data processing systems, as well as an article of manufacture for accomplishing same.

In accordance with the above, it is an object of the present invention to provide a way to verify a TOD in a quiesced and synchronous distributed data processing system.

It is another object of the present invention to provide a way to distribute a TOD in a quiesced and synchronous distributed data processing system.

The present invention provides, in a first aspect, a method of distributing and verifying a time-of-day (TOD) in a quiesced and synchronous distributed data processing system including a primary node, at least one secondary node and at least one switching element between the primary node and the at least one secondary node, wherein a primary TOD has been set for the primary node. The method comprises steps of: setting a TOD for the at least one switching element, based on the primary TOD; verifying the TOD of the at least one switching element; setting a TOD for the at least one secondary node based on the primary TOD; and verifying the TOD of the at least one secondary node.

The present invention provides, in a second aspect, an article of manufacture, comprising a computer useable medium having computer readable code means embodied therein for causing the processing of data. The computer readable program code means in the article of manufacture comprises a computer readable program code means for causing a computer to effect, in a quiesced and synchronous distributed data processing system, including a primary node, at least one secondary node and at least one switching element between the primary node and the at least one secondary node, wherein the primary TOD has been set for the primary node, setting a TOD for the at least one switching element based on the primary TOD. The computer readable program code means in the article of manufacture further comprises computer readable program code means for causing a computer to effect verifying the TOD of the at least one switching element, computer readable program codes for causing a computer to effect setting a TOD for the at least one secondary node based on the primary node, and computer readable program codes means for causing a computer to effect verifying the TOD of the at least one secondary node.

These, and other objects, features and advantages of this invention will become apparent from the following detailed description of the various aspects of the invention taken in conjunction with the accompanying drawings.

BEST MODE FOR CARRYING OUT THE INVENTION

As used herein, the term "node" refers to a portion of a data processing system including a processor, a node communication adapter and controlling software. As used herein, the term "node communication adapter" refers to a portion of a node that facilitates communication between nodes in a computer network. As used herein, the term "switch element" refers to switch chips and/or switch boards, which are the switching elements in the communication fabric of a computer network. As used herein, the term "communication fabric" refers to switch elements, node communication adapters and links between them in a given computer network. As used herein, the term "switch network" refers to all of the switching elements in a given computer network. Finally, as used herein, the term "quiesced" refers to a computer network with no activity on the communication fabric (i.e., no nodes are communicating with one another). The state of being "quiesced" most often takes place at start up, but could take place at other times.

The flow diagrams depicted herein are just exemplary. There may be many variations to these diagrams or the steps (or operations) described therein without departing from the spirit of the invention. For instance, unless otherwise noted, the steps may be performed in a different order, or steps may be added, deleted or modified. All of these variations are considered to be a part of the claimed invention.

The present invention can be included in an article of manufacture (e.g., one or more computer program products)

having, for instance, computer useable media. The media has embodied therein, for instance, computer readable program code means for providing and facilitating the mechanisms of the present invention. The article of manufacture can be included as part of a computer system or alone.

Figure 1:
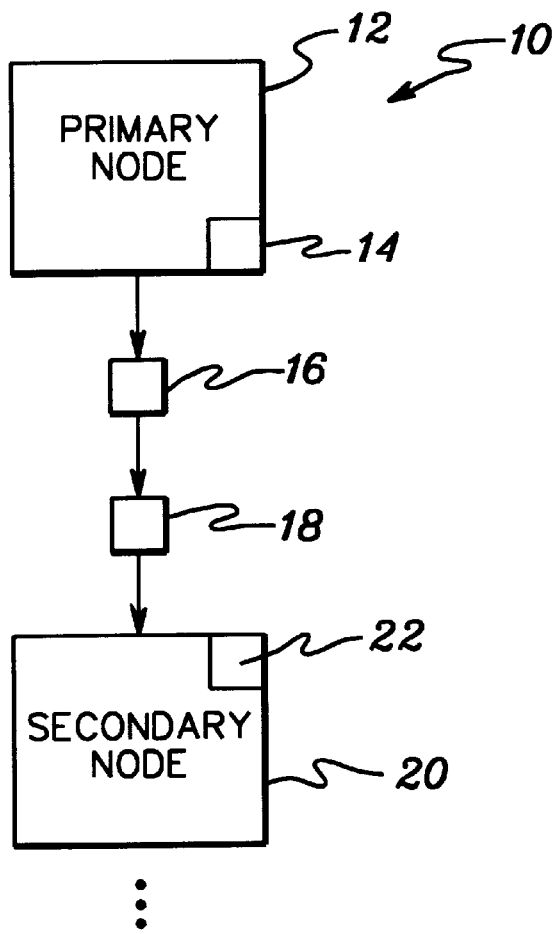
FIG. 1 is a simplified block diagram of a data processing system in which the present invention is useful.

FIG. 1 is a partial block diagram of a computer system 10 useful with the present invention. Computer system 10 is networked and comprises a primary node 12 including a communication adapter 14, switching elements 16 and 18, and a secondary node 20 including a communication adapter 22 associated therewith. It will be understood that each node also includes controlling software.

Figure 2:
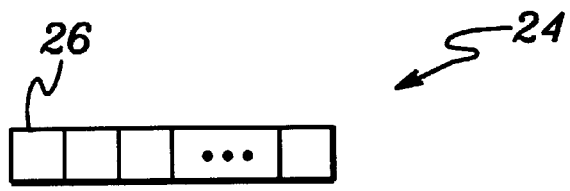
FIG. 2 depicts a TOD counter in the data processing system of FIG. 1.

FIG. 2 depicts a TOD counter present in each of the switch elements and communication adapters of computer system 10 of FIG. 1. TOD counter 24 comprises a 63-bit monotonically increasing counter operating at 75 MHz. The 64th bit 26 of TOD counter 24 serves as a valid bit, used to determine if the TOD has been previously set. All of the TOD counters in computer system 10 run according to a single oscillator or clock (not shown), such that each of the TOD counters increments during each period of the oscillator, thereby causing the TOD counters to increment at the same frequency.

A protocol using service packets will hereafter be described, the service packets being useful in synchronizing the TOD counters for the communication fabric, within an acceptable margin, with the designated primary node's TOD. The process used to synchronize the TOD counters in the communication fabric is a store-and-forward type process, where the primary node sets the local TOD counter on its associated communication adapter, then sets the TOD on the first switching element of the network. It then directs the first switching element to set the TOD in the adjacent switching element(s), until the entire switch network has been initialized. In the present exemplary system, the switch network has a tree structure where a given switch element at one level is adjacent to one or more switch elements at the next lower level. The flow of the TOD setting fans out from the primary node toward the secondary nodes. Each of the secondary nodes then sets its own TOD counter from the switch network by requesting a copy of the TOD from an adjacent switch element in response to an instruction from the primary node. When a TOD in a switching element or communication adapter of computer system 10 is set, an acknowledge is generated that includes a current TOD. The acknowledge is used to verify the TOD that has been set.

Figure 3:
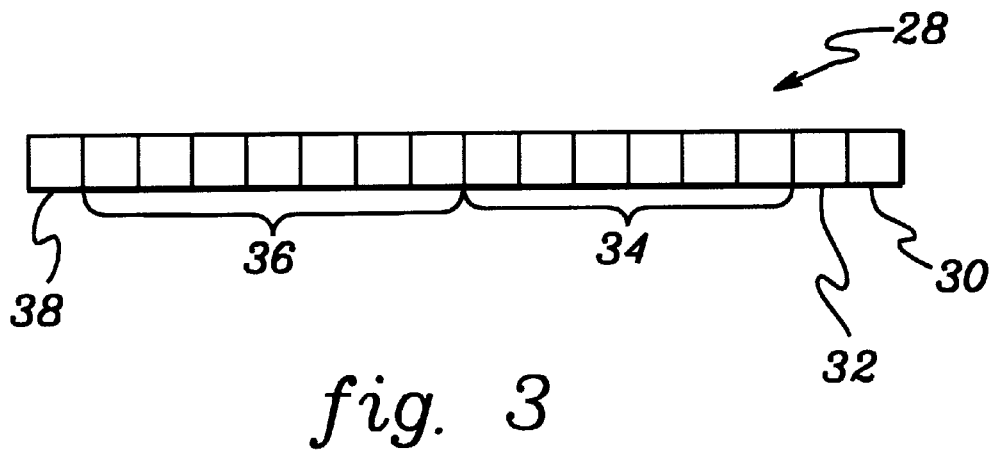
FIG. 3 is a conceptual block diagram of a service packet used with the present invention.

FIG. 3 is a conceptual block diagram of a service packet 28 used by switch elements and communication adapters in system 10 for setting a TOD (herein after referred to as a "SET TOD service packet"). SET TOD service packet 28 comprises, for byte 0 (element 30 in FIG. 3) a hexadecimal command to set the TOD. Bytes 1 and 2–7 (elements 32 and 34 in FIG. 3) are reserved. Bytes 8–14 (element 36 in FIG. 3) comprise a TOD current as of the time it is sent, inserted by the transmitting device. Byte 15 (element 38 in FIG. 3) comprises an offset for the calculated transmission delay time. The transmission delay time is a known hardware delay time, equalling the time it takes to get out of the sending element, through the transmission medium (e.g., a cable) and into the receiving element. Note, however, that without knowing the length or type of transmission medium, the time through the transmission medium must be estimated. Preferably, the reception of a SET TOD service packet by a communication adapter does not occur when other traffic is arriving. This could cause unpredictable delays in the processing of the TOD service packet, and the subsequent synchronization of the TOD counter may not be accurate. The delays stem from the service packet having to wait for the processing of previously received data packets.

Figure 4:
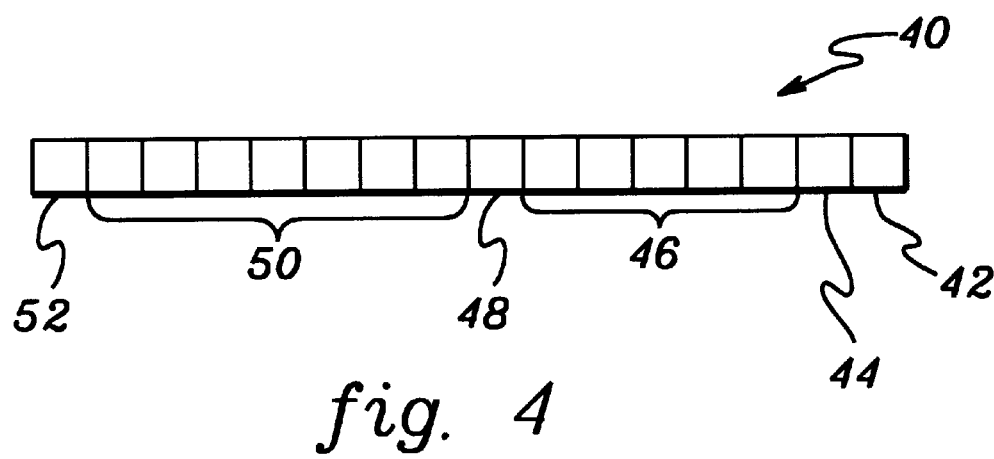
FIG. 4 is a conceptual block diagram of another service packet used with the present invention.

FIG. 4 is a conceptual block diagram of a service packet 40 used by the communication subsystem (not shown) to generate a SET TOD service packet in a switch or adapter (hereinafter referred to as a "SEND TOD service packet"). Byte 0 of the SEND TOD service packet (element 42 in FIG. 4) comprises a hexadecimal command to forward a current TOD. Bytes 1 and 2–6 (elements 44 and 46 in FIG. 4) are reserved. Byte 7 (element 48 in FIG. 4) identifies the output port of the switching element receiving the service packet to be used to forward the TOD. Bytes 8–14 (element 50 in FIG. 4) are reserved, and byte 15 (element 52 in FIG. 4) comprises an offset for the calculated transmission delay time. The transmission delay time is a known hardware delay time, equalling the time it takes to get out of the sending element, through the transmission medium (e.g., a cable) and into the receiving element.

Figure 5:
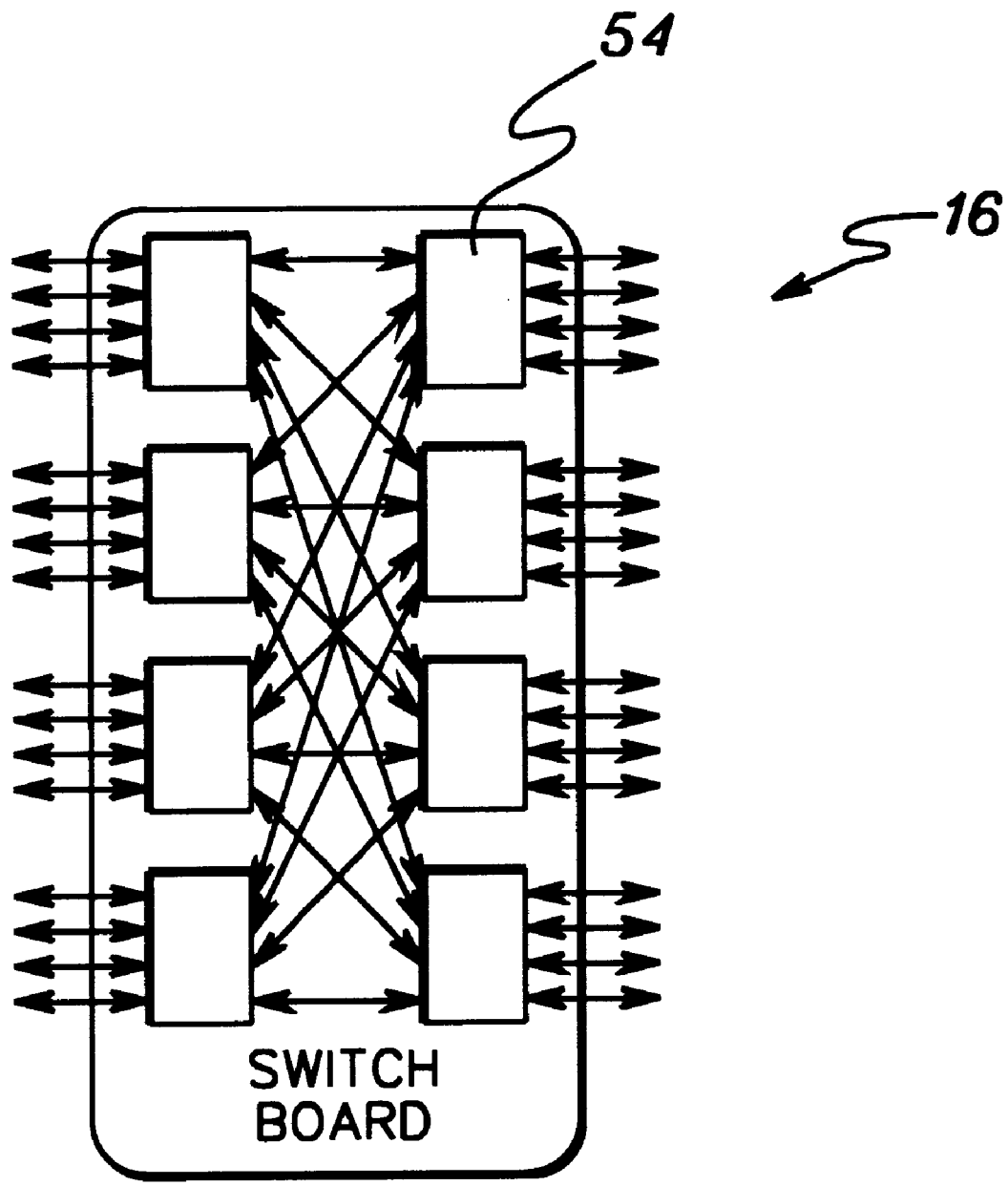
FIG. 5 is a block diagram of a switch board in the data processing system of FIG. 1.

FIG. 5 is a block diagram of switch element 16 (in this case, a switch board) in FIG. 1. Switch element 16 comprises 8 switch chips (e.g., switch chip 54). Switch element 16 has 32 send ports and 32 receive ports. One skilled in the art will understand the operation of switch chips and switch boards.

Figure 6:
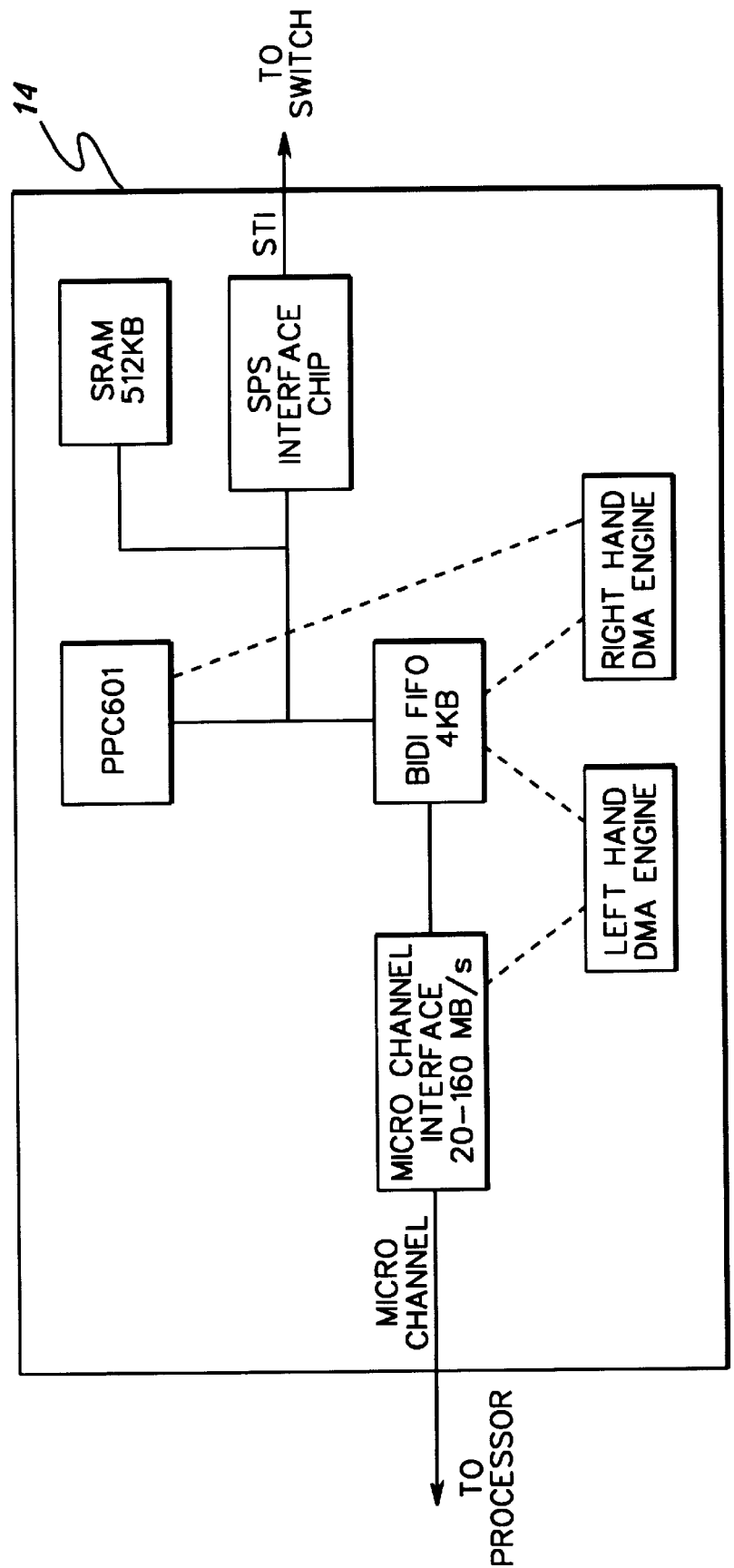
FIG. 6 is a block diagram of a communication adapter in the data processing system of FIG. 1.

FIG. 6 is a high-level block diagram of communication adapter 14 of FIG. 1. As one skilled in the art will know, a communication adapter is a means of communicating from one node to another over the communication fabric. A communication adapter facilitates communication between node processors (and their memories) over the switch fabric.

The TOD is maintained in every switch element and communication adapter in the system. The TOD in a given communication adapter is provided as a facility to applications for synchronizing parallel processes and ordering of events and transactions. The TOD in a switch element is used for synchronizing the TOD in a communication adapter in an active system. The TOD counters throughout the communication fabric will be synchronized with the TOD of the communication adapter associated with the primary node. Synchronization could be indicated by, for example, the most significant bit in the TOD counter. This bit could be set at the primary node, before TOD initialization begins. Preferably, a switch element will not forward the TOD if it has not been previously synchronized, rather, the switch element will report an error. This prevents the propagation of bad information.

Figure 7:
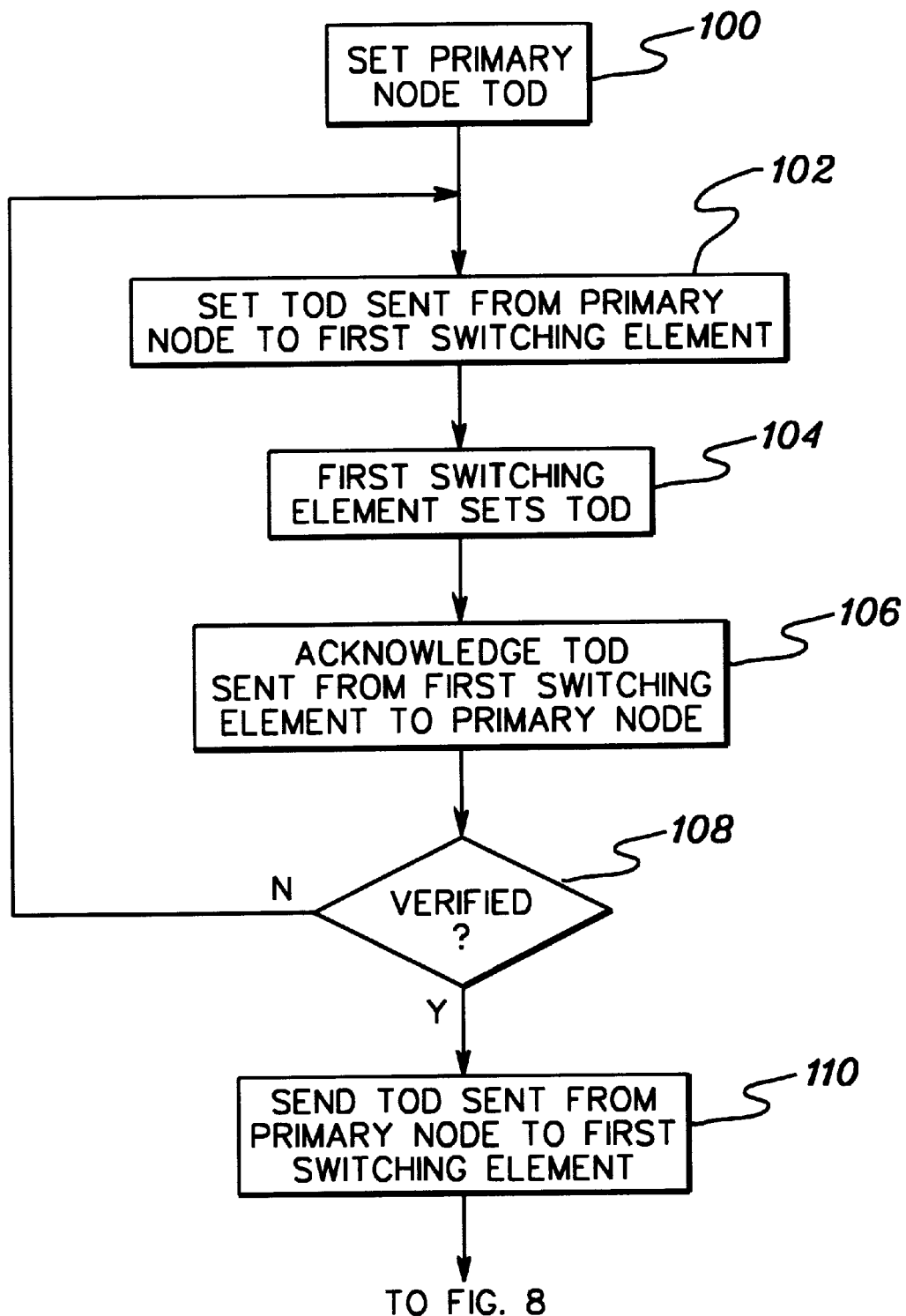
FIGS. 7 and 8 comprise a flow diagram for the TOD verification method of the present invention as it relates to switching elements.
Figure 8:
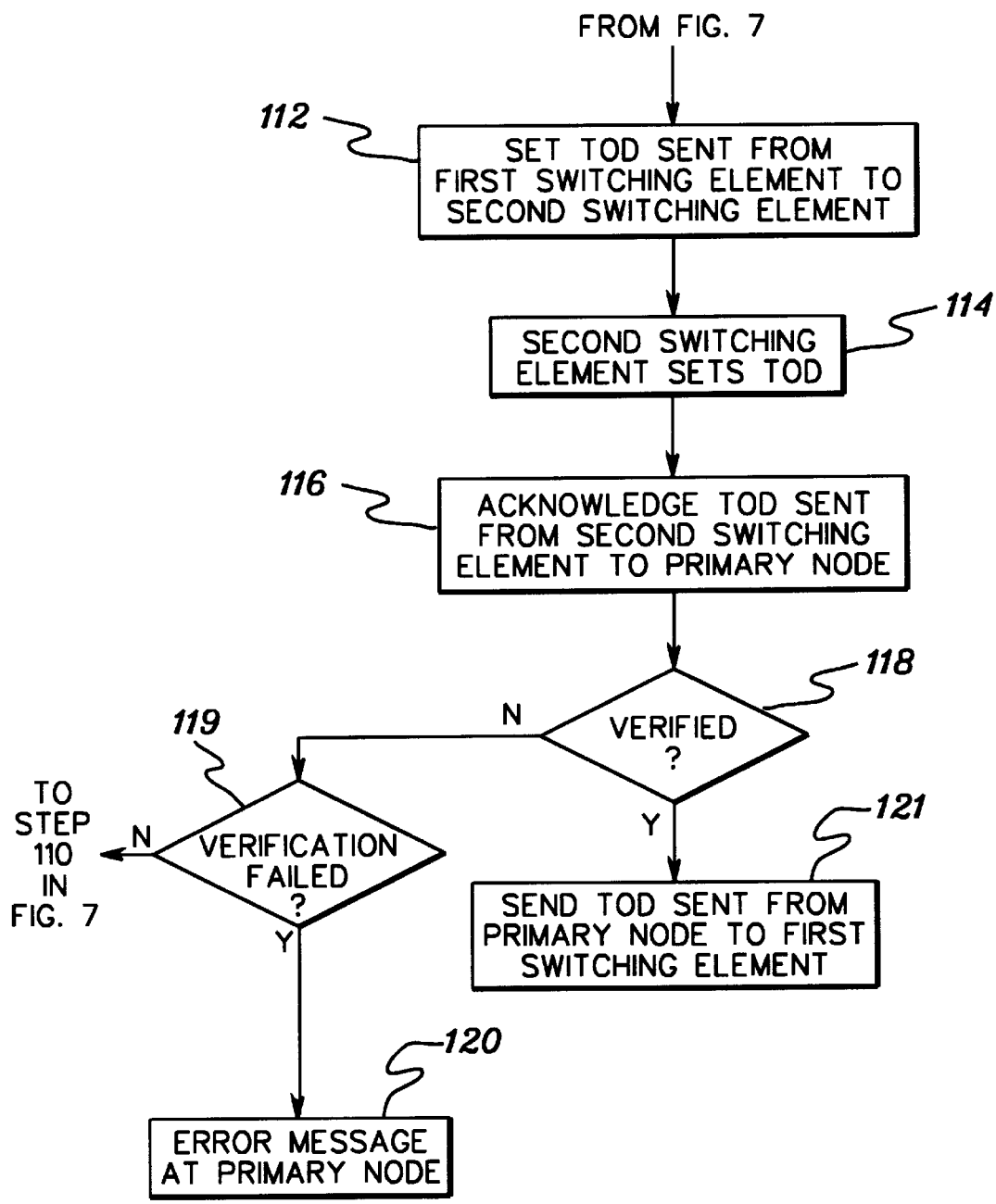

FIGS. 7 and 8 comprise a flow diagram for the propagation of the TOD between switch elements in system 10 of FIG. 1. Initially, the software at the primary node sets the TOD for the communication adapter associated with the primary node (Step 100, "SET PRIMARY NODE TOD"). The mechanics of setting the TOD for the primary node will vary from system to system, and is not important for an understanding of the present invention. After the primary node TOD is set, the primary node sends a SET TOD service packet to the first switching element (Step 102, "SET TOD SENT FROM PRIMARY NODE TO FIRST SWITCHING ELEMENT"). In response to the SET TOD service packet, the first switching element sets it TOD (Step 104, "FIRST SWITCHING ELEMENT SETS TOD"). An acknowledgement is then sent from the first switching element to the primary node, which acknowledgment includes the TOD the first switching element just set for itself (Step 106, "ACKNOWLEDGE TOD SENT FROM FIRST SWITCHING ELEMENT TO PRIMARY NODE"). The primary node then attempts to verify the acknowledge TOD (Inquiry 108, "VERIFIED?"). If the acknowledged TOD is not verified, the method returns to Step 102. If the acknowledge TOD is verified, the primary node sends a SEND TOD service packet to the first switching element (Step 110, "SEND TOD SENT FROM PRIMARY NODE TO FIRST SWITCHING ELEMENT"). The SEND TOD service packet causes the first switching element to send a SET TOD service packet to the second switching element (Step 112, "SET TOD SENT FROM FIRST SWITCHING ELEMENT TO SECOND SWITCHING ELEMENT"). The second switching element then sets its own TOD (Step 114, "SECOND SWITCHING ELEMENT SETS TOD"). As with the first switching element, the second switching element sends an acknowledge TOD to the primary node for verification (Step 116, "ACKNOWLEDGE TOD SENT FROM SECOND SWITCHING ELEMENT TO PRIMARY NODE"). The primary node then proceeds to verify the acknowledge TOD (Inquiry 118, "VERIFIED?"). If the acknowledge TOD is not verified, the method tries again, i.e., returns to step 110, until verification fails a predetermined number of times (Inquiry 119, "VERIFICATION FAILED?"), at which point an error message is produced at the primary node, indicating that initialization has failed (Step 120, "ERROR MESSAGE AT PRIMARY NODE"). If the primary node verifies the acknowledge TOD from the second switching element, the primary node sends a SEND TOD service packet to the second switching element (Step 121, "SEND TOD SENT FROM PRIMARY NODE TO SECOND SWITCHING ELEMENT"). The method continues in this manner until all switching elements in the system have set their TOD. In the present exemplary system, the switch network has a tree structure where a given switch element at one level is adjacent to one or more switch elements at the next lower level. The details of verification will be described below.

Figure 9:
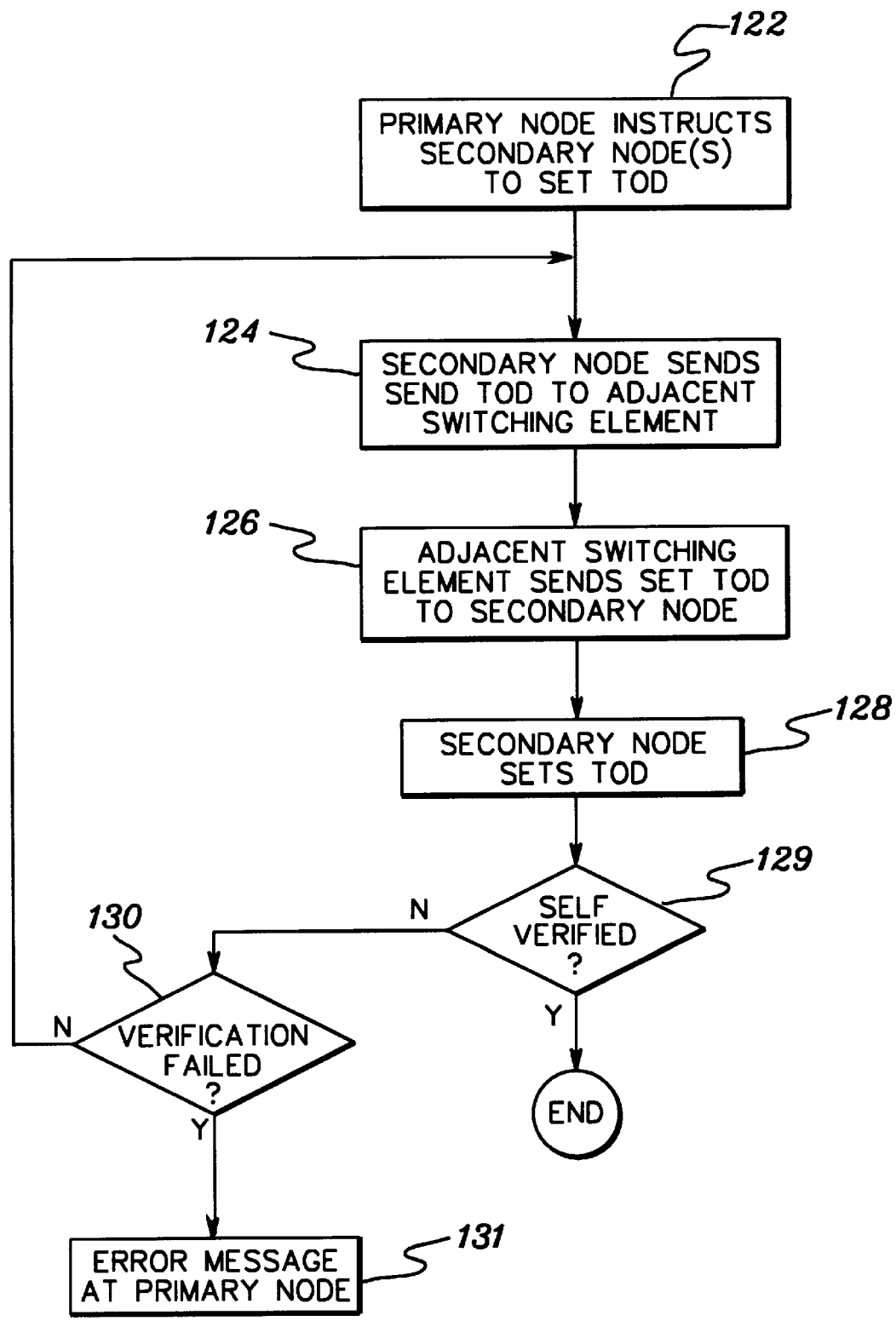
FIG. 9 is a flow diagram for the TOD verification method of the present invention as it relates to secondary nodes and their associated communication adapters.

FIG. 9 is a flow diagram for the propagation of the TOD to the communication adapters in system 10 of FIG. 1. As background to the propagation of the TOD to the communication adapters in system 10, one skilled in the art will understand that the primary node determines and identifies "routes" to get from node to node. Once these routes are identified, the primary node instructs the secondary nodes to proceed with setting the TOD for their associated communication adapter (Step 122, "PRIMARY NODE INSTRUCTS SECONDARY NODE(S) TO SET TOD"). In the present exemplary system, the command from the primary node is serial, rather than being broadcast. However, it will be understood that other command delivery methods could be used. In response to the instruction, each secondary node sends a SEND TOD service packet to an adjacent switching element (Step 124, "SECONDARY NODE SENDS SEND TOD TO ADJACENT SWITCHING ELEMENT"). The adjacent switching element then sends the SET TOD service packet to the secondary node (Step 126, "ADJACENT SWITCHING ELEMENT SENDS SET TOD TO SECONDARY NODE"). In response to the SET TOD service packet, the communication adapter associated with the secondary node sets the TOD therefore (Step 128, "SECONDARY NODE SETS TOD"). The secondary node then self-verifies the TOD just set, and if not verified, returns to Step 124 (Inquiry 129, "SELF VERIFIED?"). Preferably, the self verification is attempted a predetermined number of times. If the secondary node is still unable to self verify, an error is produced at the primary node, indicating that the secondary node cannot be communicated with (Inquiry 130, "VERIFICATION FAILED?"; and Step 131, "ERROR MESSAGE AT PRIMARY NODE").

Although there may be many different ways for the secondary node to self-verify its TOD, two exemplary methods for self-verifying will be described herein. The first, and simplest, way for the secondary node to self-verify is simply to check the valid bit (see the description of FIG. 2 above) of the TOD sent to the secondary node by the adjacent switching element. This method of self-verifying is preferred where the path between the secondary node and adjacent switch is relatively short, such that the transmission delay is negligible. In the exemplary system, the fixed length of cable between the secondary node and the adjacent switch could be, for example, 3–5 feet in length and be considered short.

Figure 10:
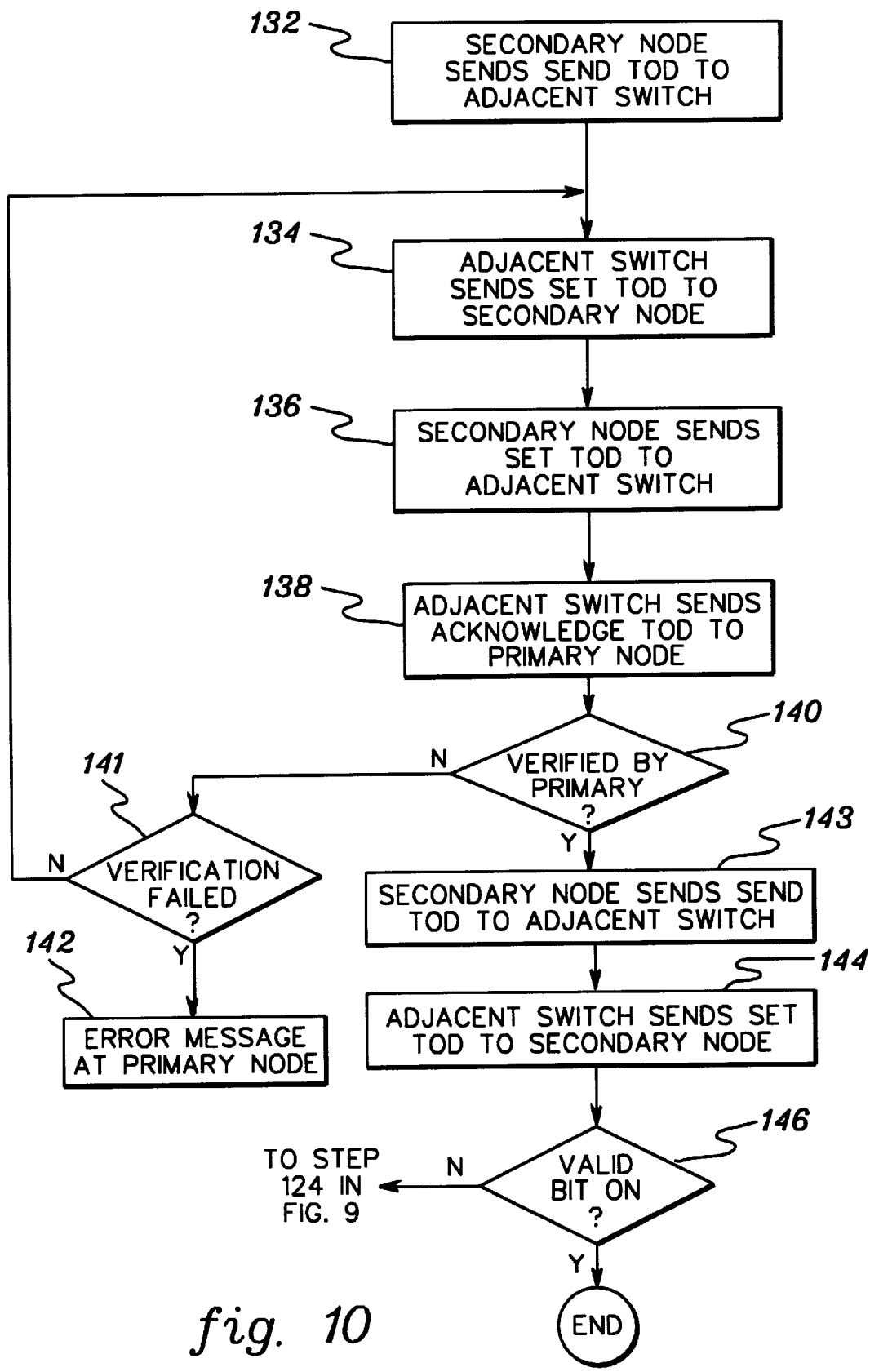
FIG. 10 is a flow diagram for one embodiment of a self-verifying method useful with the present invention.

FIG. 10 is a flow diagram for an alternative way for the secondary node to self-verify. The secondary node first sends a SEND TOD service packet to the adjacent switch (Step 132, "SECONDARY NODE SENDS SEND TOD TO ADJACENT SWITCH"). In response, the adjacent switch sends a SET TOD service packet to the secondary node (Step 134, "ADJACENT SWITCH SENDS SET TOD TO SECONDARY NODE"). The secondary node then sends a SET TOD to the adjacent switch (Step 136, "SECONDARY NODE SENDS SET TOD TO ADJACENT SWITCH"). After resetting its TOD, the adjacent switch sends an acknowledge TOD to the primary node (Step 138, "ADJACENT SWITCH SENDS ACKNOWLEDGE TOD TO PRIMARY NODE"). The primary node then attempts to verify the acknowledge TOD (Inquiry 140, "VERIFIED BY PRIMARY?"). If the primary node is unable to verify the acknowledge TOD, preferably a predetermined number of attempts is made, i.e., the method returns to Step 134 (Inquiry 141, "VERIFICATION FAILED?") until the predetermined number of attempts has been made. If the primary node is still unable to verify, an error message is produced at the primary node (Step 142, "ERROR MESSAGE AT PRIMARY NODE"), indicating that that secondary node cannot be communicated with.

If the primary node verifies the acknowledge TOD at Step 140, the secondary node sends a SEND TOD service packet to the adjacent switch (Step 143, "SECONDARY NODE SENDS SEND TOD TO ADJACENT SWITCH"). In response, the adjacent switch sends a SET TOD service packet to the secondary node (Step 144, "ADJACENT SWITCH SENDS SET TOD TO SECONDARY NODE"). The secondary node then checks the valid bit in the TOD from the adjacent switch (Inquiry 146, "VALID BIT ON?"). If the valid bit is not on, the method returns to Step 124 in FIG. 9. If the valid bit is on, the secondary node has verified the TOD.

For the primary node, verification is accomplished in accordance with the following formula:

$$\frac{DELAY}{TIME} = Dnode + \sum \bigl(Dlink\ (0{:}n)\bigr) + (Dswitch\ X(n-1)) + Dgen.$$

The variable "n" is the total number of links the acknowledge TOD must traverse, where a "link" is defined as a path (e.g., a cable) from one switching element to another or from a switching element to a communication adapter. The variable "Dnode" is a reception delay of the primary node (i.e., a delay at the associated communication adapter). The variable "Dlink" is an estimated delay for a given link. The variable "Dswitch" is a propagation delay of an intermediate switching element between a switching element sending an acknowledge TOD to the primary node and the primary node. The "X" indicates multiplication. Finally, the variable "Dgen" is a generation delay for the acknowledge TOD. In an ideal system, the TOD when the primary node captures an acknowledge TOD from a switch element should equal the TOD embedded in the acknowledge TOD plus the delay time computed according to the above formula. However, systems are generally not ideal, and there must be some tolerance built in. In the present exemplary embodiment, the tolerance is three microseconds. The tolerance must be less than the minimum latency of getting the message from one node to the next, such that transaction ordering can be maintained. However, it will be understood that a greater or lesser tolerance could be adopted for a given system. Preferably, if the tolerance is not met, further attempts are made at resetting the TOD for that switch element or secondary node.

While several aspects of the present invention have been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A method for distributing and verifying a time-of-day (TOD) in a quiesced and synchronous distributed data processing system including a primary node, at least one secondary node and at least one switching element between the primary node and the at least one secondary node, wherein a primary TOD has been set for the primary node, the method comprising steps of:

setting a TOD for the at least one switching element based on the primary TOD, comprising sending to the at least one switching element information concerning a current TOD;

verifying the TOD of the at least one switching element;

setting a TOD for the at least one secondary node based on the primary TOD; and verifying the TOD of the at least one secondary node;

wherein the information comprises a TOD current as of a time it is sent and a transmission delay time, and wherein the current TOD is calculated by the at least one switching element.

2. A method for distributing and verifying a time-of-day (TOD) in a quiesced and synchronous distributed data processing system including a primary node, at least one secondary node and at least one switching element between the primary node and the at least one secondary node, wherein a primary TOD has been set for the primary node, the method comprising steps of:

setting a TOD for the at least one switching element based on the primary TOD;

verifying the TOD of the at least one switching element, comprising; sending the TOD from the at least one switching element to the primary node, calculating a delay time for the step of sending, adding the delay time to the TOD sent to the primary node to obtain an acknowledge TOD, and comparing the acknowledge TOD to a TOD when the primary node received the acknowledge TOD;

setting a TOD for the at least one secondary node based on the primary TOD; and verifying the TOD of the at least one secondary node.

3. The method of claim 2, wherein the step of calculating comprises calculating the delay time at the primary node.

4. The method of claim 2, wherein the step of calculating comprises calculating the delay time according to the following formula:

$$\text{DELAY TIME} = Dnode + \sum \left( Dlink\ (0{:}n) \right) + (Dswitch\ X(n-1)) + Dgen.$$

wherein: n=total number of links the acknowledge TOD must traverse,

Dnode=reception delay of the primary node,

Dlink=estimated delay for a given link,

Dswitch=propagation delay of an intermediate switching element between the at least one switching element and the primary node, and Dgen=generation delay for acknowledge TOD.

5. A method for distributing and verifying a time-of-day (TOD) in a quiesced and synchronous distributed data processing system including a primary node, at least one secondary node and at least one switching element between the primary node and the at least one secondary node, wherein a primary TOD has been set for the primary node, the method comprising steps of:

setting a TOD for the at least one switching element based on the primary TOD;

verifying the TOD of the at least one switching element;

setting a TOD for the at least one secondary node based on the primary TOD; and verifying the TOD of the at least one secondary node;

wherein the at least one switching element comprises a first switching element and a second switching element, and wherein the TOD for the first switching element has been verified, the method further comprising a step of setting a TOD for the second switching element based on the TOD of the first switching element; and wherein the step of setting the TOD for the second switching element comprises steps of:

sending an instruction from the primary node to the first switching element to forward a current TOD to the second switching element; and sending a current TOD from the first switching element to the second switching element in response to the instruction from the primary node.

6. The method of claim 5, wherein the step of sending a current TOD from the first switching element to the second switching element comprises sending a TOD current as of a time it is sent and a transmission delay time, and wherein the TOD for the second switching element is calculated by the second switching element.

7. A method for distributing and verifying a time-of-day (TOD) in a quiesced and synchronous distributed data processing system including a primary node, at least one secondary node and at least one switching element between the primary node and the at least one secondary node, wherein a primary TOD has been set for the primary node, the method comprising steps of:

setting a TOD for the at least one switching element based on the primary TOD;

verifying the TOD of the at least one switching element;

setting a TOD for the at least one secondary node based on the primary TOD; and verifying the TOD of the at least one secondary node;

wherein each node comprises an associated communication adapter tracking the TOD for the associated node, wherein the primary TOD is a TOD for a communication adapter associated with the primary node, and wherein the step of setting a TOD for the at least one secondary node comprises setting a TOD for a communication adapter associated with the at least one secondary node based on the primary TOD.

8. A method for distributing and verifying a time-of-day (TOD) in a quiesced and synchronous distributed data processing system including a primary node, at least one secondary node and at least one switching element between the primary node and the at least one secondary node, wherein a primary TOD has been set for the primary node, the method comprising steps of:

setting a TOD for the at least one switching element based on the primary TOD;

verifying the TOD of the at least one switching element;

setting a TOD for the at least one secondary node based on the primary TOD, comprising sending to the at least one secondary node information concerning a current TOD; and verifying the TOD of the at least one secondary node;

wherein the information comprises a TOD current as of a time it is sent and a transmission delay time, and wherein the current TOD is calculated by the at least one secondary node.

9. A method for distributing and verifying a time-of-day (TOD) in a quiesced and synchronous distributed data processing system including a primary node, at least one secondary node and at least one switching element between the primary node and the at least one secondary node, wherein a primary TOD has been set for the primary node, the method comprising steps of:

setting a TOD for the at least one switching element based on the primary TOD;

verifying the TOD of the at least one switching element;

setting a TOD for the at least one secondary node based on the primary TOD, comprising sending to the at least one secondary node information concerning a current TOD; and verifying the TOD of the at least one secondary node;

wherein the at least one switching element comprises a switching element adjacent the secondary node, wherein the step of verifying the TOD of the at least one secondary node comprises the at least one secondary node self-verifying the TOD set therefor, and wherein the information comprises an indication of whether a TOD has been set for the switching element adjacent the secondary node.

10. The method of claim 9, wherein the step of self-verifying comprises, prior to the step of sending, the steps of:

setting a new TOD for the adjacent switching element based on the TOD of the at least one secondary node; and verifying the new TOD at the primary node.

11. An article of manufacture, comprising:

a computer useable medium having computer readable code means embodied therein for causing the processing of data, the computer readable program code means in the article of manufacture comprising:

computer readable program code means for causing a computer to effect, in a quiesced, synchronous, distributed computer system including a primary node, at least one secondary node and at least one switching element between the primary node and the at least one secondary node, wherein a primary time-of-day (TOD) has been set for the primary node, setting a TOD for the at least one switching element based on the primary TOD, comprising computer readable program code means for causing a computer to effect sending to the at least one switching element information concerning a current TOD;

computer readable program code means for causing a computer to effect verifying the TOD of the at least one switching element;

computer readable program code means for causing a computer to effect setting a TOD for the at least one secondary node based on the primary TOD; and computer readable program code means for causing a computer to effect verifying the TOD of the at least one secondary node;

wherein the computer readable program code means for causing a computer to effect sending to the at least one switching element information concerning a current TOD comprises computer readable program code means for causing a computer to effect:

sending to the at least one switching element a TOD current as of a time it is sent and a transmission delay time; and calculating via the at least one switching element the current TOD.

12. An article of manufacture, comprising:

a computer useable medium having computer readable code means embodied therein for causing the processing of data, the computer readable program code means in the article of manufacture comprising:

computer readable program code means for causing a computer to effect, in a quiesced, synchronous, distributed computer system including a primary node, at least one secondary node and at least one switching element between the primary node and the at least one secondary node, wherein a primary time-of-day (TOD) has been set for the primary node, setting a TOD for the at least one switching element based on the primary TOD, comprising computer readable program code means for causing a computer to effect:

sending the TOD from the at least one switching element to the primary node;

calculating a delay time for sending the TOD from the at least one switching element to the primary node;

adding the delay time to the TOD sent to the primary node to obtain an acknowledge TOD; and comparing the acknowledge TOD to a TOD when the primary node received the acknowledge TOD;

computer readable program code means for causing a computer to effect verifying the TOD of the at least one switching element;

computer readable program code means for causing a computer to effect setting a TOD for the at least one secondary node based on the primary TOD; and computer readable program code means for causing a computer to effect verifying the TOD of the at least one secondary node.

13. The article of manufacture of claim 12, wherein the computer readable program code means for causing a computer to effect calculating a delay time comprises computer readable program code means for causing a computer to effect the calculating at the primary node.

14. The article of manufacture of claim 12, wherein the computer readable program code means for causing a computer to effect calculating a delay time comprises computer readable program code means for causing a computer to effect the calculating according to the following formula:

$$\frac{\text{DELAY}}{\text{TIME}} = Dnode + \sum \bigl(Dlink\ (0{:}n)\bigr) + (Dswitch\ X(n-1)) + Dgen.$$

wherein: n=total number of links the acknowledge TOD must traverse,

Dnode=reception delay of the primary node,

Dlink=estimated delay of a link,

Dswitch=propagation delay of intermediate switching element, and

Dgen=generation delay for acknowledge TOD.

15. An article of manufacture, comprising
a computer useable medium having computer readable code means embodied therein for causing the processing of data, the computer readable program code means in the article of manufacture comprising:
computer readable program code means for causing a computer to effect, in a quiesced, synchronous, distributed computer system including a primary node, at least one secondary node and at least one switching element between the primary node and the at least one secondary node, wherein a primary time-of-day (TOD) has been set for the primary node, setting a TOD for the at least one switching element based on the primary TOD;
computer readable program code means for causing a computer to effect verifying the TOD of the at least one switching element;
computer readable program code means for causing a computer to effect setting a TOD for the at least one secondary node based on the primary TOD; and
computer readable program code means for causing a computer to effect verifying the TOD of the at least one secondary node;
wherein the at least one switching element comprises a first switching element and a second switching element, and wherein the TOD for the first switching element has been verified, the article of manufacture further comprising computer readable program code means for causing a computer to effect setting a TOD for the second switching element based on the TOD of the first switching element, comprising computer readable program code means for causing a computer to effect:
sending an instruction from the primary node to the first switching element to forward a current TOD to the second switching element; and
sending a current TOD from the first switching element to the second switching element in response to the instruction from the primary node.

16. The article of manufacture of claim 15, wherein the computer readable program code means for causing a computer to effect sending a current TOD from the first switching element to the second switching element comprises computer readable program code means for causing a computer to effect:
sending from the first switching element to the second switching element a TOD current as of a time it is sent and a transmission delay time; and
calculating the TOD for the second switching element at the second switching element.

17. An article of manufacture, comprising:
a computer useable medium having computer readable code means embodied therein for causing the processing of data, the computer readable program code means in the article of manufacture comprising:
computer readable program code means for causing a computer to effect, in a quiesced, synchronous, distributed computer system including a primary node, at least one secondary node and at least one switching element between the primary node and the at least one secondary node, wherein a primary time-of-day (TOD) has been set for the primary node, setting a TOD for the at least one switching element based on the primary TOD;
computer readable program code means for causing a computer to effect verifying the TOD of the at least one switching element;
computer readable program code means for causing a computer to effect setting a TOD for the at least one secondary node based on the primary TOD; and
computer readable program code means for causing a computer to effect verifying the TOD of the at least one secondary node;
wherein each node comprises an associated communication adapter tracking the TOD for the associated node, wherein the primary TOD is a TOD for a communication adapter associated with the primary node, and wherein the computer readable program code means for causing a computer to effect setting a TOD for the at least one secondary node comprises computer readable program code means for causing a computer to effect setting a TOD for a communication adapter associated with the at least one secondary node based on the primary TOD.

18. An article of manufacture, comprising:
a computer useable medium having computer readable code means embodied therein for causing the processing of data, the computer readable program code means in the article of manufacture comprising:
computer readable program code means for causing a computer to effect, in a quiesced, synchronous, distributed computer system including a primary node, at least one secondary node and at least one switching element between the primary node and the at least one secondary node, wherein a primary time-of-day (TOD) has been set for the primary node, setting a TOD for the at least one switching element based on the primary TOD;
computer readable program code means for causing a computer to effect verifying the TOD of the at least one switching element;
computer readable program code means for causing a computer to effect setting a TOD for the at least one secondary node based on the primary TOD, comprising computer readable program code means for causing a computer to effect sending to the at least one second node information concerning a current TOD, wherein the computer readable program code means for causing a computer to effect sending to the at least one secondary node information concerning a current TOD comprises computer readable program code means for causing a computer to effect:
sending to the at least one secondary node a TOD current as of a time it is sent and a transmission delay time; and
calculating the current TOD at the at least one secondary node; and
computer readable program code means for causing a computer to effect verifying the TOD of the at least one secondary node.

19. An article of manufacture, comprising:
a computer useable medium having computer readable code means embodied therein for causing the processing of data, the computer readable program code means in the article of manufacture comprising:

computer readable program code means for causing a computer to effect, in a quiesced, synchronous, distributed computer system including a primary node, at least one secondary node and at least one switching element between the primary node and the at least one secondary node, wherein a primary time-of-day (TOD) has been set for the primary node, setting a TOD for the at least one switching element based on the primary TOD;

computer readable program code means for causing a computer to effect verifying the TOD of the at least one switching element;

computer readable program code means for causing a computer to effect setting a TOD for the at least one secondary node based on the primary TOD, comprising computer readable program code means for causing a computer to effect sending to the at least one secondary node information concerning a current TOD; and computer readable program code means for causing a computer to effect verifying the TOD of the at least one secondary node;

wherein the at least one switching element comprises a switching element adjacent the secondary node, wherein the computer readable program code means for causing a computer to effect verifying the TOD of the at least one secondary node comprises computer readable program code means for causing a computer to effect the at least one secondary node self-verifying the TOD set therefore, and wherein the information comprises an indication of whether a TOD has been set for the switching element adjacent the secondary node.

20. The article of manufacture of claim 19, wherein the computer readable program code means for causing a computer to effect the at least one secondary node self-verifying the TOD set therefore comprises computer readable program code means for causing a computer to effect, prior to effecting sending the information:

setting a new TOD for the adjacent switching element based on the TOD of the at least one secondary node; and verifying the new TOD at the primary node.

* * * * *